Patented Jan. 29, 1935

1,989,512

UNITED STATES PATENT OFFICE 1,989,512

PROCESS FOR THE UTILIZATION OF SLUDGE ACID

Willy Glaser, Ober-Rochlitz, Czechoslovakia

No Drawing. Application September 8, 1931, Serial No. 561,812. In Czechoslovakia September 10, 1930

1 Claim. (Cl. 23—117)

This invention relates to improvements in the utilization of the so-called sludge acid or spent sulphuric acid which is generally derived from refining of petroleum, petroleum products or similar mineral oils with sulphuric acid.

It is already known that sulphuric acid which is contaminated with organic substances, can be worked up into sulphates, as for instance iron sulphate, aluminum sulphate or the like. These known processes, however, have the disadvantage that the separation of the sulphate from the impurities of the acid can be carried out only incompletely. The end product mostly is discolored or has the very unpleasant odour of the sludge acid or its value is diminished in a similar manner with regard to its technical or commercial use.

The primary object of this invention is to provide a novel and improved process for the utilization of sludge acid, whereby all traces of the organic substance from the acid are eliminated and prevented from going over into the finished product.

A further object is to provide a novel and improved process for the utilization of sludge acid, whereby the organic impurities of the acid not only do not cause any undesirable results in the process, but on the contrary reduce the manufacturing expenses.

My process which primarily is suited for the production of aluminum sulphates from aluminum silicates or other aluminum or clay containing material, consists in heating up the reaction mixture, for instance clay and sludge acid in a suitable manner, so that the organic substance is burnt off completely.

In order to completely burn off the organic matter it is not ordinarily necessary that the temperature be anywhere near to the point where dissociation of iron sulphate or aluminum sulphate in the mixture begins. The decomposition of aluminum sulphate may begin at a slight extent at about 700° C., and that of iron sulphate at a little lower temperature, but these temperatures vary widely dependent upon the nature and amount of the impurities, and the dissociation may not be complete until about 1000° C. or 1200° C.

Generally the burning, i. e. calcining of the mixture occurs with sufficient velocity that in the beginning there is a red hot glowing heat, and very seldom a temperature any higher than 480° C. has to be reached.

It is found convenient, but not necessary, to start the reaction of the acid with the aluminum containing material for instance, before the mass is introduced into the calcining furnace. It is not important whether this is obtained in an open vessel, under pressure or in some similar way. Furthermore the raw material may be used or mixed in the raw or precalcined condition.

Ordinarily the reaction mixture which is introduced into the calcining furnace contains considerable amounts of free acid, and the reaction is not completed and entirely neutral aluminum sulphate is not formed until the mixture is heated in the calcining furnace.

Through the burning off of the organic substance a large part or all of the external heat can be saved, which is an important advantage from the economical standpoint in comparison to the ordinary method with pure sulphuric acid.

A further advantage of our method for the utilization of sludge acid is that the trivalent iron compounds which are present, are reduced to the bivalent state, whereby they are much easier separated later on from the aluminum salts.

The working up of the calcined material is done in the well known manner by means of leaching, extracting, filtering, etc.

The same method as shown above may be also applied for the production of iron salts, zinc salts, copper salts and other inorganic salts from suitable raw material. The most essential part in working up such material is that the reaction is always induced and completed below the dissociation temperature of the sulphate in question.

As an example my process for instance may be carried out in the following manner:—

1000 kg. of raw, ground clay or bauxite with 40% $Al_2O_3$ are mixed with 1100 kg. of sludge acid having 54 deg. Bé. The reaction is induced by heating the mixture to 160° C. The comminuted mass, which still contains about 20% of the free acid, is then burnt in a calcining drum at about 550° C., in an oxidizing atmosphere, and the grayish-white stone obtained, which contains 88% of the total aluminum in form of water-free, neutral aluminum sulphate. This is then worked up in any well known manner into aluminum sulphate, alum or the like products.

It is obvious that the above described method may be somewhat altered, without departing from the inventive idea of the process and apparatus involved. For instance the starting of the reaction may be carried out in the same vessel as the calcining, and also it is not required that the mixture be comminuted before it is subjected to the calcining procedure.

I claim:

The method of producing metal sulphates from sludge acid obtained from treating petroleum products with sulphuric acid, which includes the steps of mixing the sludge acid with clay or bauxite, heating the mixture to about 160° C. to induce a reaction, and then calcining in an oxidizing atmosphere under conditions which will substantially completely burn out all organic matter.

WILLY GLASER.